(12) United States Patent
Smook

(10) Patent No.: US 10,519,934 B2
(45) Date of Patent: Dec. 31, 2019

(54) MODULAR COUPLING OF A WIND TURBINE GEARBOX TO A GENERATOR

(71) Applicants: ZF Friedrichshafen AG, Friedrichshafen (DE); ZF WIND POWER ANTWERPEN N.V., Lommel (BE)

(72) Inventor: Warren Smook, Huldenberg (BE)

(73) Assignees: ZF FRIEDRICHSHAFEN AG, Friedrichshafen (DE); ZF WIND POWER ANTWERPEN N.V., Lommel (BE)

(*) Notice: Subject to any disclaimer, the term of this patent is extended or adjusted under 35 U.S.C. 154(b) by 198 days.

(21) Appl. No.: 15/123,007

(22) PCT Filed: Feb. 11, 2015

(86) PCT No.: PCT/EP2015/052820
§ 371 (c)(1),
(2) Date: Sep. 1, 2016

(87) PCT Pub. No.: WO2015/135714
PCT Pub. Date: Sep. 17, 2015

(65) Prior Publication Data
US 2017/0074249 A1    Mar. 16, 2017

(30) Foreign Application Priority Data
Mar. 11, 2014    (DE) .................. 10 2014 204 479

(51) Int. Cl.
*F03D 15/00*    (2016.01)
*F03D 13/10*    (2016.01)
(Continued)

(52) U.S. Cl.
CPC ............... *F03D 15/00* (2016.05); *F03D 9/25* (2016.05); *F03D 13/10* (2016.05); *F03D 80/70* (2016.05);
(Continued)

(58) Field of Classification Search
CPC . F03D 15/00; F03D 9/25; F03D 80/50; F03D 80/70; H02K 1/30; H02K 7/003; H02K 7/1838
See application file for complete search history.

(56) References Cited

U.S. PATENT DOCUMENTS 8,338,980 B2    12/2012    Minadeo et al.
8,622,869 B2 *   1/2014    Mourani ............. F16H 37/0813
                                                           475/332
(Continued)

FOREIGN PATENT DOCUMENTS

DE    10 2004 028 746 A1    12/2005
EP          0 811 764 A1    12/1997

OTHER PUBLICATIONS

German Search Report Corresponding to 10 2014 204 479.0 dated Jan. 22, 2015.
(Continued)

*Primary Examiner* — Sean Gugger
(74) *Attorney, Agent, or Firm* — Davis & Bujold PLLC; Michael J. Bujold

(57) ABSTRACT

An assembly for use in a drive-train of a wind turbine having a transmission, a generator and a module. The module includes a shaft or hub, at least one bearing and a support structure. The shaft of the module or the hub is mounted by the bearing so as to rotate in the support structure. The shaft or the hub can be connected in a rotationally fixed manner to a shaft of the transmission. A rotor of the generator can be fixed to the shaft of the module or to the hub. The support
(Continued)

structure can be fixed to a housing of the transmission or the generator. At least one assembly safety device is provided in order to be able to fix the rotor of the generator. When the rotor of the generator is fixed by way of the assembly safety device, the module can be fitted and removed.

15 Claims, 10 Drawing Sheets

(51) Int. Cl.
*H02K 7/18* (2006.01)
*F03D 9/25* (2016.01)
*H02K 7/00* (2006.01)
*F03D 80/70* (2016.01)

(52) U.S. Cl.
CPC ........... *H02K 7/003* (2013.01); *H02K 7/1838* (2013.01); *F05B 2220/706* (2013.01); *F05B 2230/70* (2013.01); *F05B 2240/50* (2013.01); *F05B 2260/40* (2013.01)

(56) References Cited

U.S. PATENT DOCUMENTS

| 8,907,517 | B2* | 12/2014 | Mongeau | H02K 7/1838 |
| | | | | 290/55 |
| 2006/0104815 | A1* | 5/2006 | Siegfriedsen | F16H 1/48 |
| | | | | 416/170 R |
| 2007/0075548 | A1 | 4/2007 | Bagepalli et al. | |
| 2009/0058094 | A1* | 3/2009 | Jansen | F16H 1/28 |
| | | | | 290/55 |
| 2010/0133854 | A1* | 6/2010 | Jansen | F16H 1/28 |
| | | | | 290/1 C |
| 2010/0329867 | A1* | 12/2010 | Patel | H02K 7/102 |
| | | | | 416/169 R |
| 2012/0133154 | A1* | 5/2012 | Minadeo | F16H 1/227 |
| | | | | 290/1 C |

OTHER PUBLICATIONS

International Search Report Corresponding to PCT/EP2015/052820 dated May 4, 2015.
Written Opinion Corresponding to PCT/EP2015/052820 dated May 4, 2015.

* cited by examiner

MODULAR COUPLING OF A WIND TURBINE GEARBOX TO A GENERATOR

This application is a National Stage completion of PCT/EP2015/052820 filed Feb. 11, 2015, which claims priority from German patent application serial no. 10 2014 204 479.0 filed Mar. 11, 2014.

FIELD OF THE INVENTION

The invention concerns an assembly for use in the drive-train of a wind turbine.

BACKGROUND OF THE INVENTION

During the operation of a wind turbine defects can occur. To keep maintenance costs as low as possible, it is important for defective components to be easily accessible and able to be replaced in a simple manner. In the wind turbines known from the prior art, the disassembly of the generator in particular is difficult.

From the document EP 0811764 B1 a wind turbine is known, in which a machine support serves for the attachment of a transmission and a generator. In this case the transmission and the generator are on opposite sides of the machine support. In addition a housing of the generator with a stator is fixed onto the machine support.

A sun gear shaft serves as the output shaft of the transmission. This passes through the machine support into the generator. A rotor of the generator is mounted on a tubular support structure fixed to the machine support. The support structure is so arranged that the sun gear shaft extends through the support structure. The spline teeth and a sun gear connected integrally to the sun gear shaft are on opposite sides of the support structure.

Fixed on the support structure are the inner races of two bearings. Their outer races are fixed in a hollow shaft that surrounds the support structure. The hollow shaft is driven by the sun gear shaft by way of spline teeth. The hollow shaft serves as a pole wheel carrier.

To disassemble the generator, first its housing together with all the generator components fixed in the housing have to be removed. The now exposed rotor must be removed in order to access its bearing. Although part of the sun gear shaft is now accessible, the sun gear shaft cannot be taken off. For that purpose the transmission would have to be removed.

SUMMARY OF THE INVENTION

The purpose of the present invention is to design a drive-train of a wind turbine so as to avoid the disadvantages inherent in the prior art systems described at the start. In particular the accessibility of individual components of the drive-train, and hence the ease of maintaining it, should be improved.

An assembly according to the invention for use in the drive-train of a wind turbine comprises a transmission, a generator and a module. The module has a shaft or a hub, at least one bearing and a support structure. The shaft of the module or the hub is mounted and able to rotate in the support structure by means of a bearing.

For the arrangement of the shaft of the module or hub and the support structure relative to one another, two alternatives are conceivable. In a first version the shaft of the module is at least partially within the support structure, or it runs through the support structure. In this case the inner race of the bearing is fixed onto the shaft of the module. The outer race of the bearing is fixed in the support structure. In a second version the support structure is arranged at least partially within the hub. The inner race of the bearing is then fixed onto the support structure. Correspondingly, the outer race of the bearing is fixed in the hub.

Preferably, the bearing allows just one rotary degree of freedom of the shaft of the module or the hub. Thus, the shaft or hub cannot tilt about an axis perpendicular to its rotational axis. The shaft of the module or hub is in this case mounted exclusively by means of the at least one bearing. Further bearings are not needed. Correspondingly, this means that the shaft or hub is mounted exclusively in the support structure. In particular therefore, every bearing by means of which the module shaft or hub is mounted, is fixed in the support structure. There are preferably two bearings.

The shaft of the module or the hub and a shaft of the transmission can form a working surface pair, so that a rotationally fixed connection of the shaft of the module or the hub with the transmission shaft is formed. This enables the transmission of torque from the transmission shaft to the shaft of the module or the hub.

The transmission shaft can in particular be an output shaft. An output shaft of a transmission is understood to be a shaft with meshing teeth, such that the shaft is acted upon by an output torque of the transmission by way of the teeth.

In particular, the transmission shaft can be in the form of a sun gear shaft.

Preferably, the connection between the transmission shaft and the shaft of the module or hub can be released. Thus, in particular the transmission shaft and the shaft of the module or hub are not connected to one another integrally, but as two parts. Regarding this, particularly suitable is a spline teeth connection such that the shaft of the module or hub forms a first part of the spline connection and the transmission shaft forms a second part thereof. Thus, the module's shaft or hub and the transmission shaft can be plugged one into the other to produce the spline connection.

A rotor of the generator can be fixed to the shaft of the module or the hub.

A rotor is generally understood to be the non-stationary part of a rotary generator.

Fixing a first component to a second component is generally understood to mean the forming of a connection between the first and second components, which opposes any relative movement between the first and second components. Such fixing may be indirect, i.e. involving a third component, or direct, i.e. without any third component.

In the case of indirect fixing, the first component is fixed to the third component. The third component, in turn, is then fixed to the second component. In a direct connection of the first to the second component the two components may be joined by friction force, or with interlock, or by a material-merged method. This is expressed by the formulation "the first component is joined to the second component". Thus, when the first component is joined to the second component, the first component is fixed directly onto the second component. In particular, there is then a frictional, interlocked or material-merged connection between the first and second components.

Preferably, the rotor of the generator is fixed exclusively to the shaft of the module or the hub. Thus, besides the shaft of the module or the hub and a possible third component by way of which the rotor can be fixed indirectly to the module's shaft or the hub, there are no other components to which the rotor is fixed—whether directly or indirectly.

Since the shaft of the module or the hub is mounted to rotate about just one rotational axis, by virtue of its attachment to the module's shaft or the hub the rotor can rotate about the same rotational axis. Thus, the shaft of the module or the hub restrict any translational degrees of freedom of the rotor of the generator and allow exactly two rotational degrees of freedom of the rotor of the generator.

The transmission, the module and the generator are preferably arranged so that either the shaft of the module or the transmission shaft extends through the support structure and correspondingly through the bearing. In particular, the support structure and the bearing can extend coaxially with the shaft of the module and/or the shaft of the transmission, around the shaft of the module and/or the transmission shaft.

Such an arrangement is produced when the generator and the transmission are located at least partially on two different sides of the support structure and the bearing. At least part of the transmission and at least part of the generator are therefore arranged on different sides of a plane extending through the support structure and/or through the bearing. A load path of a torque from one of the shafts of the transmission, via the shaft of the module, to the rotor of the generator, directed coaxially with the rotational axis of the bearing and the rotor of the generator, passes through the bearing.

The support structure can be fixed on a housing of the transmission or of the generator. Preferably, the support structure and the housing can be bolted to one another. Furthermore, it is preferable if only the housing serves for the fixing of the support structure. Thus, the support structure is not fixed to any other components. In particular, it is preferable for the fixing of the support structure to the housing to be releasable.

According to the invention, an assembly safety device is provided. This is a device, different from the module and from any part thereof, for fixing the rotor of the generator, preferably in a fixed position, so that all translational and rotational movements of the rotor of the generator are prevented. The assembly safety device is preferably designed such that it can be removed.

Advantageously, there are in particular two versions of the assembly safety device. In a first version the rotor of the generator can be fixed to the housing of the transmission by means of the assembly safety device. Fixing of the transmission to the housing is preferred, since this enables the demounting of the housing of the generator and makes the assembly safety device simply accessible.

In a second version of the assembly safety device, the rotor of the generator can be fixed to the housing of the generator by means of the assembly safety device.

According to the invention, the module can be fitted and removed without having to dismantle components of the transmission, in particular its shafts, or components of the generator, in particular its rotor.

The fixing of the support structure to the housing of the transmission or of the generator is preferably designed to be releasable. Moreover, it is preferable to connect the rotor of the generator releasably to the shaft or hub. Furthermore, the rotationally fixed connection of the shaft of the module or of the hub to the transmission shaft is also preferably releasable.

In the operating condition, the shaft of the module or the hub serves to support the rotor of the generator. However, if the module and therefore its shaft or hub has been removed, that support is lacking. In order to fix the rotor of the generator in such a case, the assembly safety device is provided.

Particularly for maintenance purposes the ability to fit and take off the module is advantageous. In the event of damage this reduces the time required for repairing or replacing one of the components of the module. It is not necessary—as it is with the systems known from the prior art—to dismantle the generator component by component in order to access the damaged component. Instead a module can be prepared, for example in a workshop, and exchanged with the module containing the damaged components.

Furthermore, the weight of the components that have to be lifted by a crane for fitting and dismantling operations is reduced. Whereas previously an external crane was usually needed in order to separate the generator from the transmission, the module can be fitted and removed using a crane integrated in the engine gondola of the wind turbine. This saves time and eliminates the costs incurred for the provision of the external crane.

It is also advantageous that the rotor of the generator can remain in its place, since the rotor of the generator as a rule comprises strong permanent magnets. If the rotor of the generator has to be removed, there is a risk that ferromagnetic components inside the engine gondola might be attracted. This could cause injury to assembly workers working in the engine gondola. There is also some risk of damaging the rotor.

A transport safety device can be provided in order to be able to transport the generator without the module. By means of such a transport safety device the rotor of the generator can be fixed to the housing of the generator. This is particularly important when the module is manufactured by the maker of the transmission and the generator (without the module) is supplied by a generator manufacturer. Depending on the design of the assembly, the assembly safety device can also be used as the transport safety device.

In a particularly preferred further development of the invention, the module itself fulfills the function of a transport safety device. For that purpose at least a first part of the generator housing can be fixed at least to the support structure. The housing of the transmission is in that case designed such that the support structure can be fixed to the transmission housing.

The fixing of the first part of the generator housing to the support structure makes it possible to fit and remove the module and the generator as a unit. The module can thus be fitted and removed while at least the first part of the generator housing is fixed to the support structure.

Such a further development puts a manufacturer of the generator in a position to use the module for testing the generator. The generator is then delivered with the module to a manufacturer of the transmission, and during this the module can serve as a transport safety device.

Besides the rotor of the generator, in another preferred further development of the invention the stator of the generator also remains in place when the module is fitted and removed. According to this further development the module can be fitted and removed while at least a first part of the generator housing is fixed to the housing of the transmission. In this case the generator housing is preferably designed to carry the stator of the generator.

In general terms a stator is that part of a generator which is static and does not move.

The support structure and thus also the bearing are preferably positioned outside the housing of the transmission. In particular therefore, the support structure and the bearing are outside the transmission housing before they are fitted and after they have been fitted, i.e. after the support structure has been fixed to the transmission housing or the generator housing.

Also preferred is to arrange the support structure and thus also the bearing inside the generator housing in the assembled condition. When the support structure has been fixed to the housing of the transmission or the generator, it is accordingly inside the generator housing.

To be able to maintain the module, the housing of the generator is preferably designed in such manner that after the fixing of the support structure to the housing of the transmission or the generator has been released, and after fixing of the rotor of the generator to the shaft or hub has also been released and the rotor of the generator has been secured by means of the assembly safety device, the module can be taken out of the housing of the generator. For this, the module must in particular be accessible from outside through the generator housing. Thus, the module can be fitted and removed while at least a first part of the generator housing is fixed to the transmission housing.

The first part of the generator housing preferably has an opening through which the module is accessible for purposes of fitting and removal. In particular, for fitting and removal, the module can be inserted into the generator housing and removed therefrom through the opening.

Preferably, the generator housing is made in at least two parts. In this case a cover forms a second part of the generator housing. The cover can be fitted onto the first part of the generator housing so as to close off the opening. For the fitting and removal of the module, the cover can be taken off so that the opening is unobstructed.

With a two-part housing having the above-described cover as its second part, the assembly can be designed such that the rotor can be fixed to the first part of the generator housing by means of the assembly safety device.

At least one fixing element can be provided for fixing the support structure to the housing of the transmission or the generator. At least one further fixing element can be provided for fixing at least the first part of the generator housing to the support structure. In particular, releasable fixings of the support structure to the housing of the transmission or the generator and of the first part of the generator housing to the support structure can be made by means of such a fixing element.

To be able to fit and remove the module, however, the fixing elements must be accessible. Accordingly, in another preferred further development the rotor of the generator has a first intermediate component or the hub has at least a first cut-out, through which at least one of the fixing elements can be inserted and/or removed.

The first intermediate component is a component that can be provided as a connection between the rotor of the generator and the shaft of the module or the hub. Thus, the rotor of the generator can be joined to the first intermediate component. Correspondingly, the intermediate component can be joined to the shaft of the module or to the hub.

Usually, the module is arranged offset relative to the rotor of the generator on the transmission side, i.e. in the direction toward the transmission. Correspondingly, the rotor of the generator is arranged offset relative to the module on the generator side, i.e. in the direction toward the generator. However, to be able to fit and remove the module while the rotor of the generator is fixed by means of the assembly safety device, in a preferred further development the rotor of the generator has a second cut-out through which the module can be at least partially inserted. This cut-out is preferably located centrally, i.e. the rotational axis of the rotor of the generator extends through the second cut-out.

Depending on the design of the module in each case, various intermediate components may be needed for connection to the rotor of the generator or to the shaft of the transmission. The above-mentioned first intermediate component is preferably used, if the module is designed with a shaft, in order to connect the rotor of the generator to the shaft. The shaft can be arranged so that it projects into the housing of the transmission. Inside the housing of the transmission there is then an element, preferably a toothed spline, for connecting the transmission shaft to the shaft of the module in a rotationally fixed manner.

In the case when the module is designed with a hub, the hub can be joined directly to the rotor of the generator. However, it is then preferred to use a second intermediate component to connect the hub rotationally fixed to the transmission shaft. In that case the hub is joined to the second intermediate component. Particularly preferably, the hub and the second intermediate component are connected releasably so that for the fitting and removal of the module the second intermediate component can be removes from the hub. Furthermore the second intermediate component is designed to form a rotationally fixed connection with the transmission shaft. Preferably, the second intermediate component is connected to the transmission shaft by spline teeth.

To enable the fitting and removal of the module, in another preferred further development the first intermediate component and/or the second intermediate component can be removed. In particular it is preferable for the first and/or the second intermediate component to be removable when the rotor of the generator is fixed by means of the assembly safety device while at least the first part of the generator housing is fixed to the transmission housing, and while the module is fitted, i.e. the support structure is fixed to the housing of the transmission or of the generator.

That the first intermediate component can be removed as described above is particularly preferable if the first intermediate component has no cut-out. In that case it may be necessary to remove the first intermediate component in order to make accessible the fixing element serving to fix the support structure onto the housing of the transmission or of the generator.

Stray currents produced by the generator can lead to sparking between the rolling elements and the rolling surfaces of a bearing. This results in damage to the bearing. In a preferred embodiment, therefore, the rotor of the generator is electrically insulated relative to the other components of the assembly by means of one or more insulators. For this, the hub or the first intermediate component consist of a first part and a second part, such that the rotor can be joined to the first part. The insulators serve to insulate the first part electrically relative to the second part. This prevents electric currents from flowing between the first and second parts.

Furthermore, the insulators must ensure that the first part is fixed to the second part. Accordingly, a first insulator can be designed to support the first part in at least one radial direction and preferably in every radial direction relative to the second part. This can be done for example by arranging the first insulator radially between the first and second parts, so that a load path running radially is formed between the first and second parts by the first insulator.

Particularly preferred is an embodiment having a second and a third insulator. These insulators are each clamped between the first part and the second part. The second part grips the first part and presses the second and third insulators against the first part. Thus, the second part clamps the first part between the second and third insulators. In that way, forces in opposite directions act upon the two insulators.

By virtue of the described arrangement of the second and third insulators, the function of a slipping clutch can be realized. If torque from the second part transmitted by way of the second and third insulators remains below a certain threshold value, the second part is frictionally connected to the first part via the second and third insulators. The first and second parts then rotate at the same speed.

In contrast, if the torque transmitted exceeds the threshold value, then slipping takes place between the first and the second insulator and the first and/or second part. This protects the transmission against torque peaks that can occur, possibly due to short-circuits in the generator or in the electricity supply.

A method according to the invention for removing the module described from the assembly, comprises the following steps:
- if necessary, opening the generator or removing the cover of the generator housing;
- fixing the rotor of the generator by means of the assembly safety device;
- releasing the fixing of the generator rotor to the shaft or hub;
- if necessary, removing the first intermediate component and/or the second intermediate component;
- releasing the fixing of the support structure to the housing of the transmission or the generator, if necessary by removing the fixing element;
- removing the module.

These process steps are preferably carried out in the sequence indicated. The sequence given, however, is not conclusive. Thus, alternative embodiments of the method according to the invention with a different sequence of the process steps indicated are possible.

By carrying out the converse process steps in the reverse sequence, the module can be fitted into the assembly. Such a process comprises the following steps:
- insertion of the module;
- fixing the support structure onto the housing of the transmission or the generator;
- if necessary, joining the rotor of the generator to the first intermediate component and joining the first intermediate component to the shaft of the module or to the hub, and/or forming a rotationally fixed connection between the second intermediate component and the transmission shaft and joining the second intermediate component to the hub;
- fixing the rotor of the generator to the shaft of the module or to the hub;
- removing the assembly safety device;
- closing the housing of the generator.

BRIEF DESCRIPTION OF THE DRAWINGS

Below, example embodiments of the invention are described, these being illustrated in the figures, in which the same indexes denote the same or functionally equivalent features. In detail, the figures show.

DETAILED DESCRIPTION OF THE PREFERRED EMBODIMENTS

Figure 1:
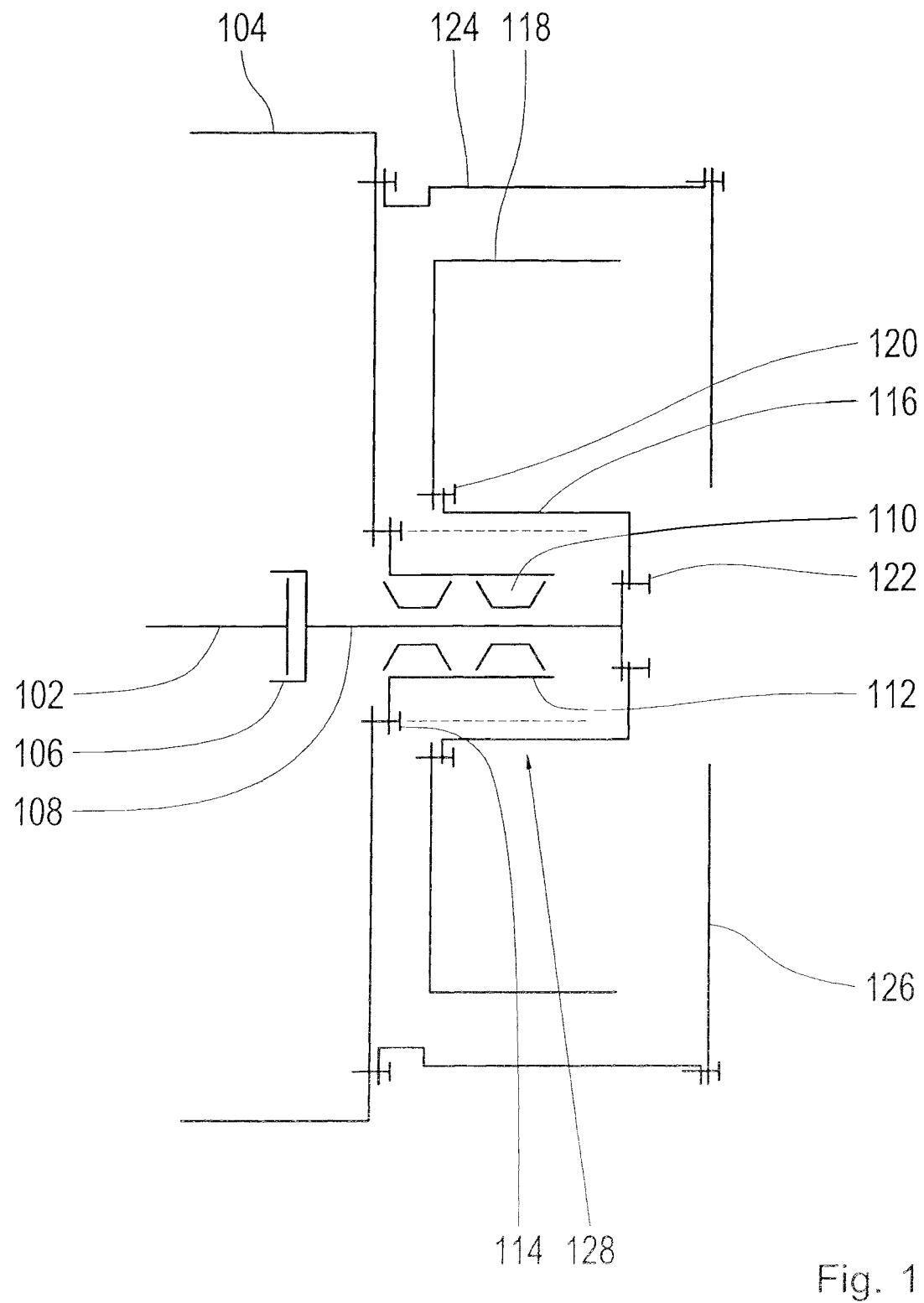
FIG. 1: A module for coupling a transmission to a generator, having an internal shaft.

A first shaft 102 according to FIG. 1 is inside a transmission housing 104. By means of spline teeth 106 the first shaft 102 is connected in a rotationally fixed manner to a second shaft 108. Like the first shaft 102, the spline teeth 106 are inside the transmission housing 104. In contrast, the second shaft 108 is only partly within the transmission housing 104. Another part of the second shaft 108 projects out of the transmission housing 104.

The second shaft 108 is mounted to rotate in a support structure 112 by means of two bearings 110. The inner races of the bearings 110 are fixed on the second shaft 108. The outer races of the bearings 110 are fixed in the support structure 112. The latter is joined to the transmission housing 104 by means of screw-bolts 114.

A first intermediate component 116 serves to connect the second shaft 108 to a rotor 118. The rotor is connected to the first intermediate component 116 by screw-bolts 120. Furthermore, the first intermediate component 116 is connected by screw-bolts 122 to a flange of the second shaft 108.

A generator housing 124 encapsulates the rotor 118, the first intermediate component 116, the support structure 112, the bearings 110 and part of the second shaft 108. The transmission housing 104 and the generator housing 124 are bolted to one another.

To make the inside of the generator housing 124 accessible for maintenance work, the generator housing 124 has a removable cover 126. The cover is bolted to another part of the generator housing 124.

Figure 2:
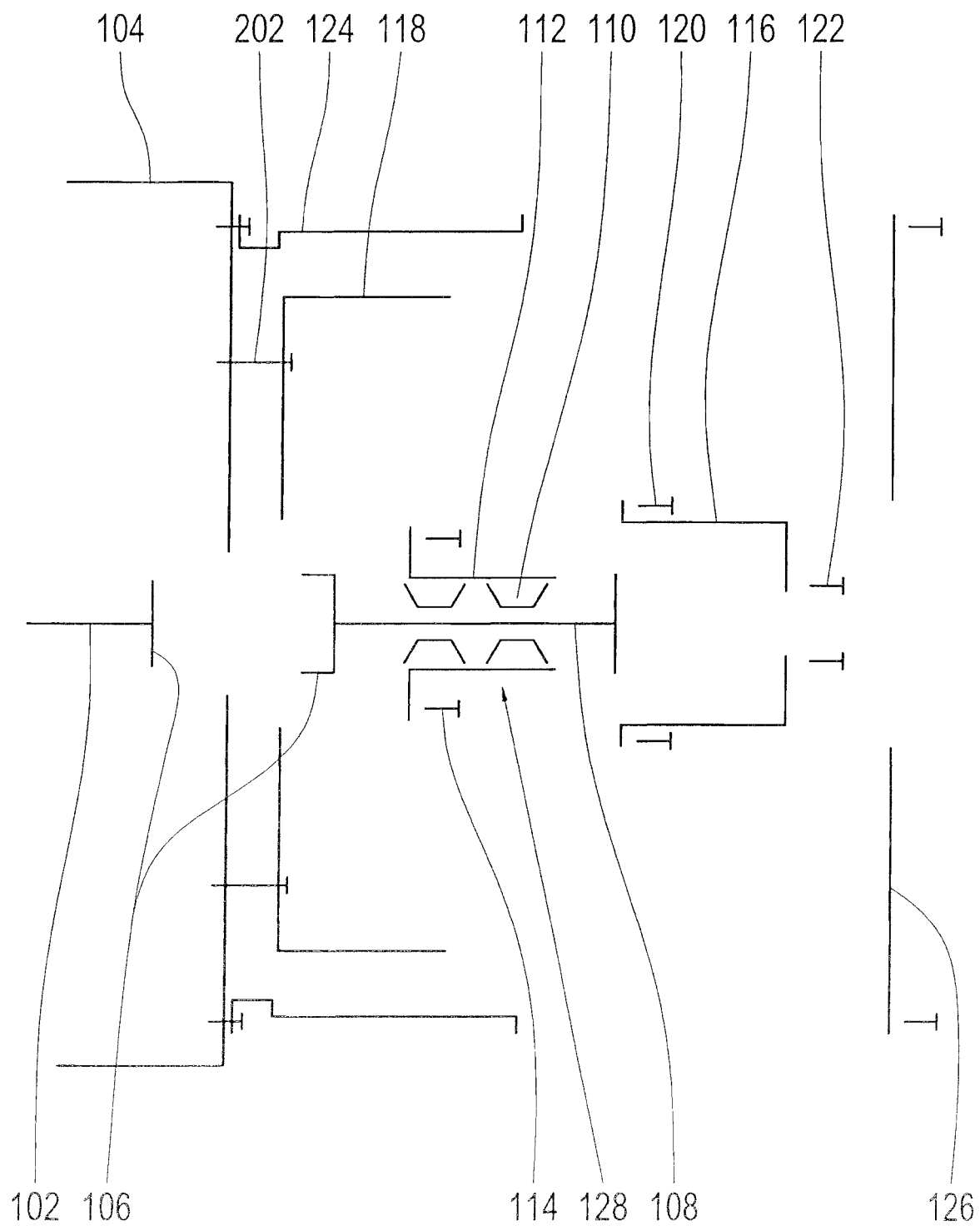
FIG. 2: A first possibility for fitting and removing such a module.

The second shaft 108, the bearings 110 and the support structure 116 constitute a module 128 that can be removed. This is made clear by FIG. 2.

To remove the module 128, first the inside of the generator housing 124 is made accessible by removing the cover 126. Now, the rotor 108 can be fixed to the transmission housing 104 by means of assembly safety devices 202, in order to remove the module 128. For this it is necessary to make the screw-bolts 114 accessible. According to the procedure illustrated in FIG. 2, this happens when, after unscrewing the bolts 120 and 122, the first intermediate component 116 is removed. During this the rotor 108 is held in position by the assembly safety devices 202.

Once the first intermediate component 110 has been removed, the screw-bolts 114 and the module 128 are accessible. When the screw-bolts 114 have been removed, the module 128 can be extracted. During this the first shaft 102 remains in place.

Figure 3:
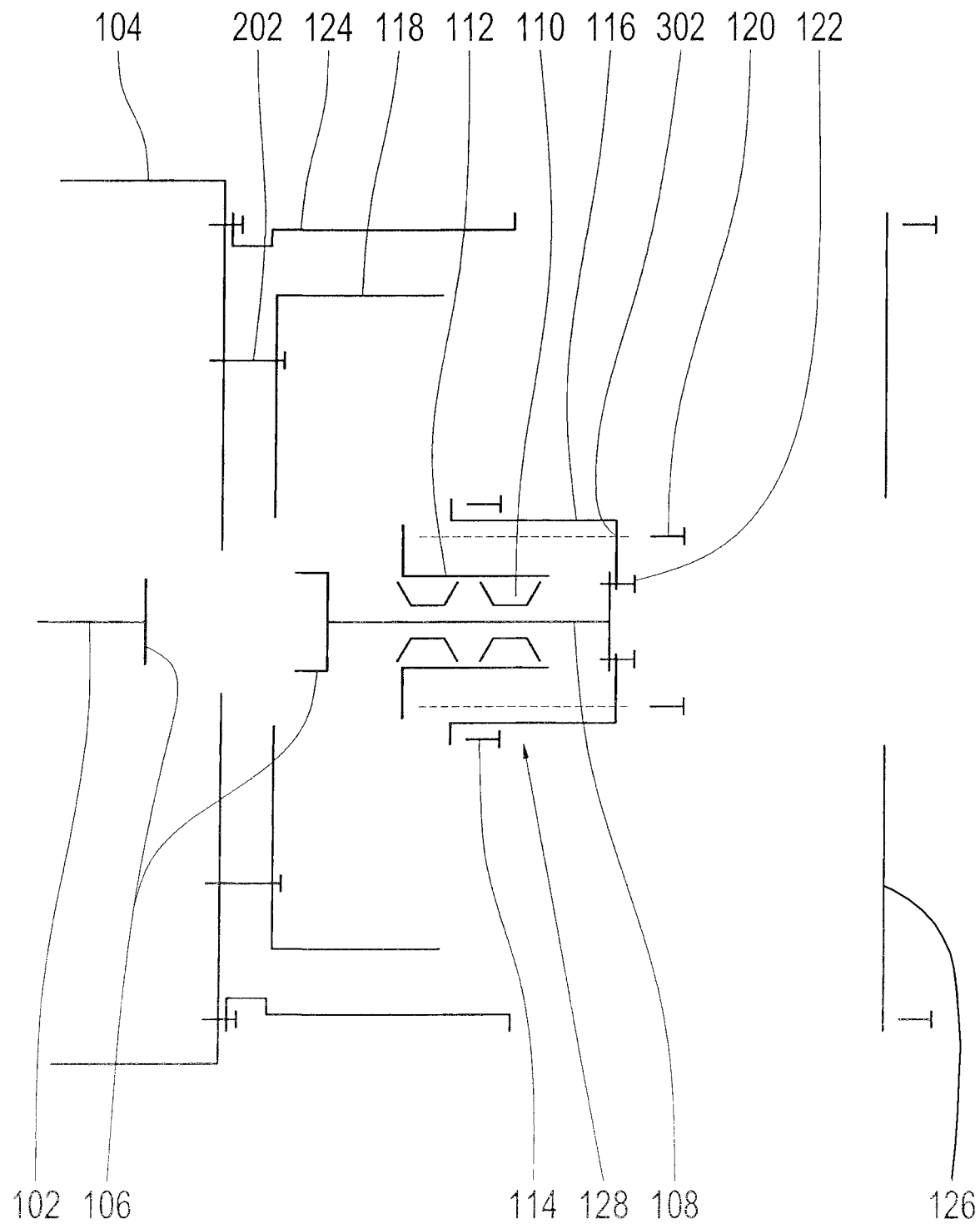
FIG. 3: A second possibility for fitting and removing such a module.

FIG. 3 shows a modified procedure. In this case the first intermediate component 116 has cut-outs 302. For each of the screw-bolts 114 there is a cut-out 302. The cut-outs 302 are arranged so that the screw-bolts 114 are accessible through the cut-outs 302. Thus, to remove the screw-bolts 114 the connection between the first intermediate component 116 and the flange of the second shaft 108 does not have to be released. Instead, the first intermediate component 110 remains on the flange of the second shaft 108.

Figure 4:
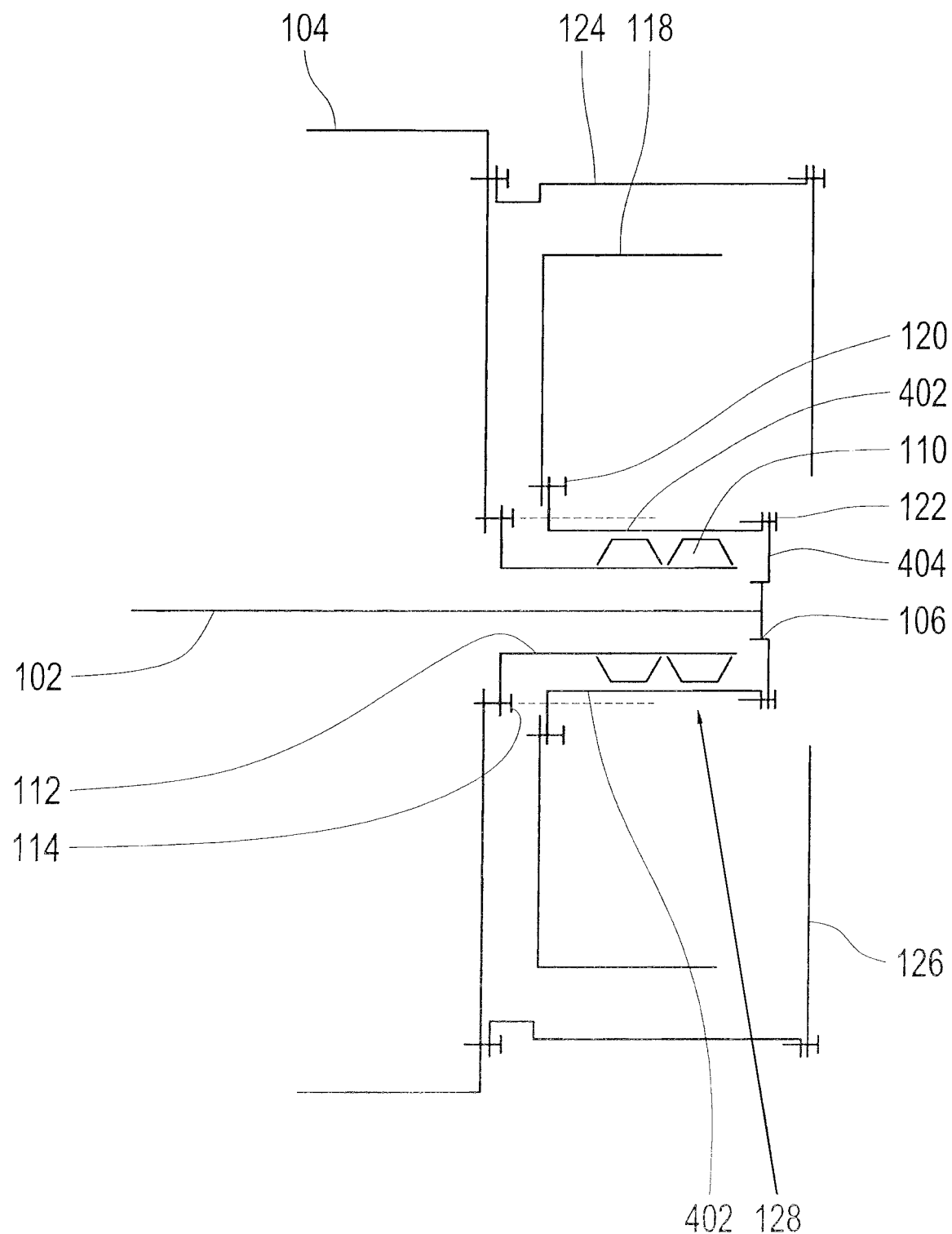
FIG. 4: A module for coupling a transmission to a generator with an external hub.

The module 128 shown in FIG. 4 has a hub 402 instead of the second shaft 108. The support structure 112 is arranged so that it is partially within the hub 402. By means of the bearings 110 the hub 402 is mounted and able to rotate in the support structure 112. The inner races of the bearings 110 are fixed on the support structure 112. The hub 402 is fixed to the outer races of the bearings 110.

The first shaft 102 projects out of the transmission housing 104 and extends through the support structure 112. On the side of the support structure 112 opposite the transmission housing 104 are the spline teeth 106 by means of which the first shaft 102 is connected rotationally fixed to a second intermediate component 404.

The screw-bolts 122 serve to join the second intermediate component 404 to the hub 402. In this way a rotationally fixed connection is formed between the first shaft 102 and the hub 402.

The screw-bolts 120 serve to connect the rotor 118 to the hub 402.

Figure 5:
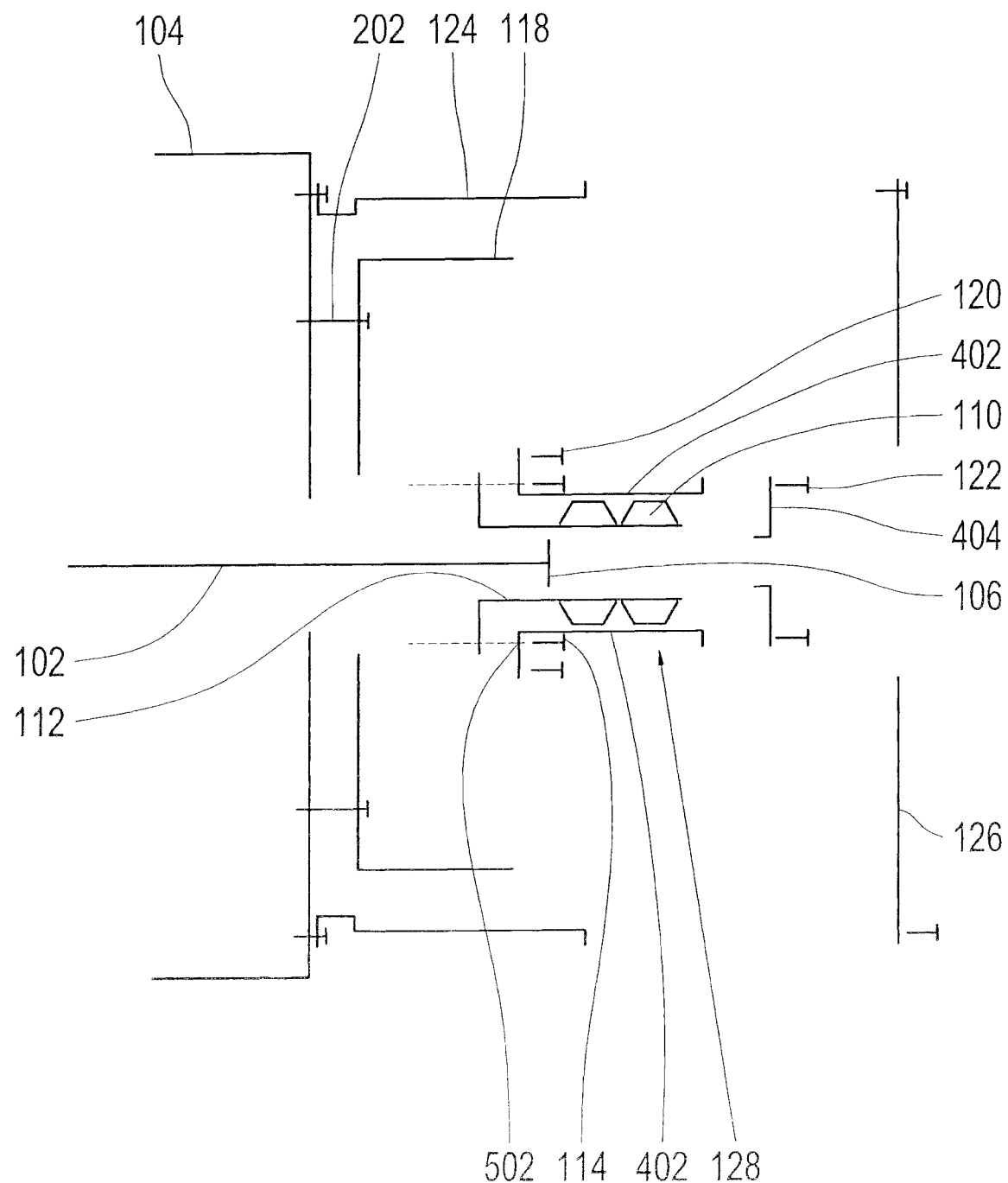
FIG. 5: A possibility for fitting and removing such a module.

In the example embodiment shown in FIG. 4, the hub 402 covers the screw-bolts 114 by which the support structure 112 is fixed to the transmission housing 104. In order to remove the module 128 as shown in FIG. 5, the hub is therefore provided with cut-outs 502. The cut-outs 502 are arranged so that the screw-bolts 114 are accessible through the cut-outs 502 and can be inserted and removed through the cut-outs 502.

To remove the module 128, first the cover 126 is taken off. When the rotor 118 has been secured by means of the assembly safety devices 202, the module 128 can be taken out. After undoing the screw-bolts 120 and 122, the second intermediate component 404 is first removed. Through the cut-outs 502 the screw-bolts 114 can now be removed. This releases the connection of the support structure 112 to the transmission housing 104, so that the module 128 can be removed. During this the first shaft 102 remains in place.

Figure 6:
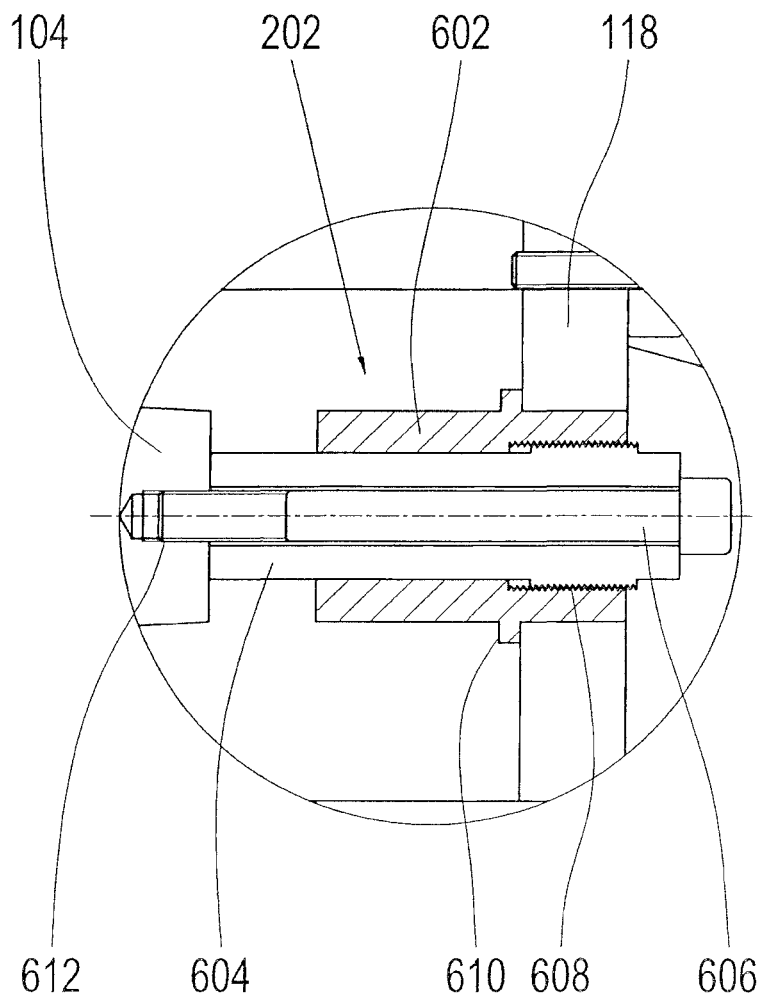
FIG. 6: An assembly safety device.

FIG. 6 shows as an example a design of the assembly safety device 202. The assembly safety device 202 consists of an outer shell 602, an inner shell 604 and a screw-bolt 606. The outer shell 602 is set into a cut-out of the rotor 118. Since the outer shell 602 is not accessible through the opening in the generator housing 124 left free by the cover 126, the outer shell 602 is preassembled.

To fix the rotor, the inner shell 604 is inserted into the outer shell 602 and screwed into it. For this, the outer shell 602 and the inner shell 604 form a matching thread pair 608. When the inner shell 604 is screwed into the outer shell 602, it comes in contact with the transmission housing 104. An abutment 610 prevents the outer shell 602 from being pushed out of the rotor 118 during this.

The screw-bolt 606 is inserted into the inner shell 604 screwed into the outer shell 602. The transmission housing 104 has a thread 612 into which the screw-bolt 606 can then be screwed. The rotor 118 is then fixed to the transmission housing 104 thereby, so that the module 128 can be removed.

Figure 7:
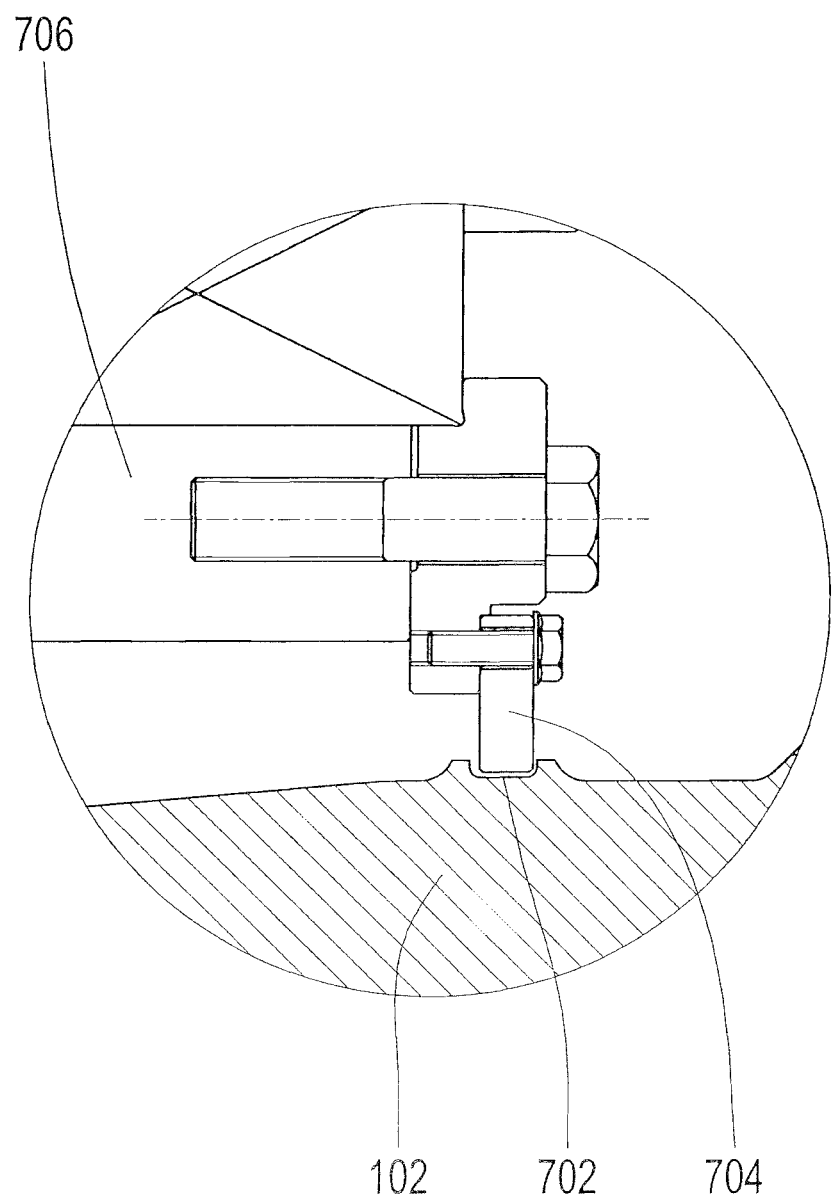
FIG. 7: A device for holding a transmission output shaft.

When the module 128 is removed, there is a risk that the first shaft 102 may tilt in the radial direction and/or be displaced in the axial direction. A device whose purpose is to prevent that is shown in FIG. 7. The first shaft 102 has a groove 702 running concentrically to the first shaft 102. In this groove 702 there engages a disk 704. The disk 704 is fixed to a transmission component 706 which cannot move in the axial and radial directions. The component 706 can for example be a planetary carrier. Example embodiments are also conceivable, in which the transmission housing 104 itself is the component 706.

During normal operation there is an air gap between the disk 704 and the groove 702. Under these circumstances the disk 704 and the groove 702 have no function. In particular, the rotation of the first shaft 102 is not impeded by the disk 704. In contrast, when the module 128 is removed the disk 704 running in the groove 702 restricts the first shaft 102 and prevents it from tilting in the radial direction or moving in the axial direction.

Figure 8:
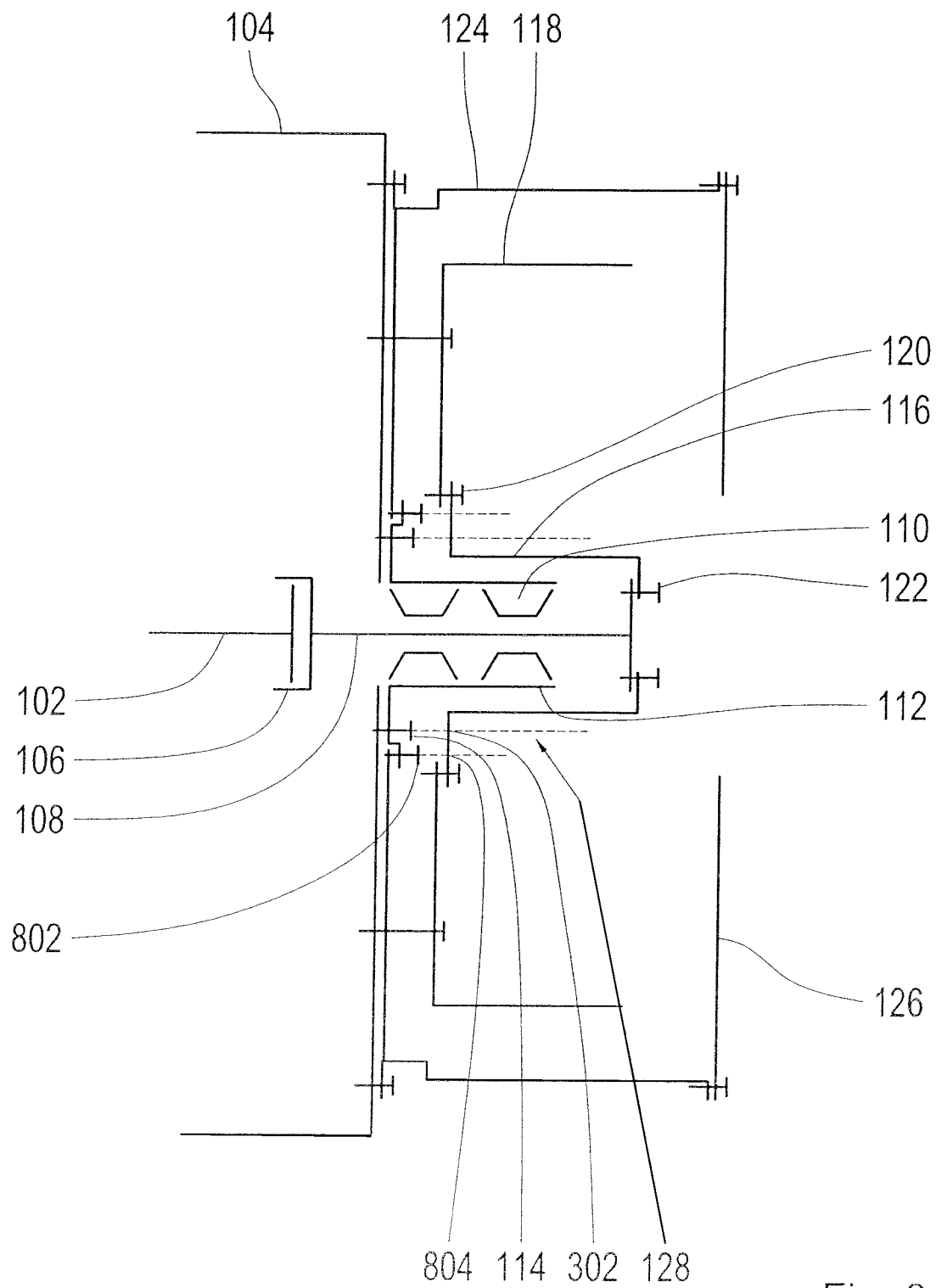
FIG. 8: A module with a transmission housing fixed on it.

As shown in FIG. 8, further screw-bolts 802 can be provided for fixing the generator housing 124 to the support structure 112. For this the generator housing 124 is designed so that it can be bolted to the transmission housing 104 and the support structure 112. Besides the cut-outs 302, through which the screw-bolts 114 for fixing the support structure 112 to the transmission housing 104 are accessible, the first intermediate component 116 has further cut-outs 804. These cut-outs 804 serve to make accessible the screw-bolts 802 by which the generator housing 124 can be fixed to the support structure 112.

To remove the module 128 the screw-bolts 114 and the screw-bolts 802 are undone. During this the generator housing 124 remains bolted to the transmission housing 104.

Figure 9:
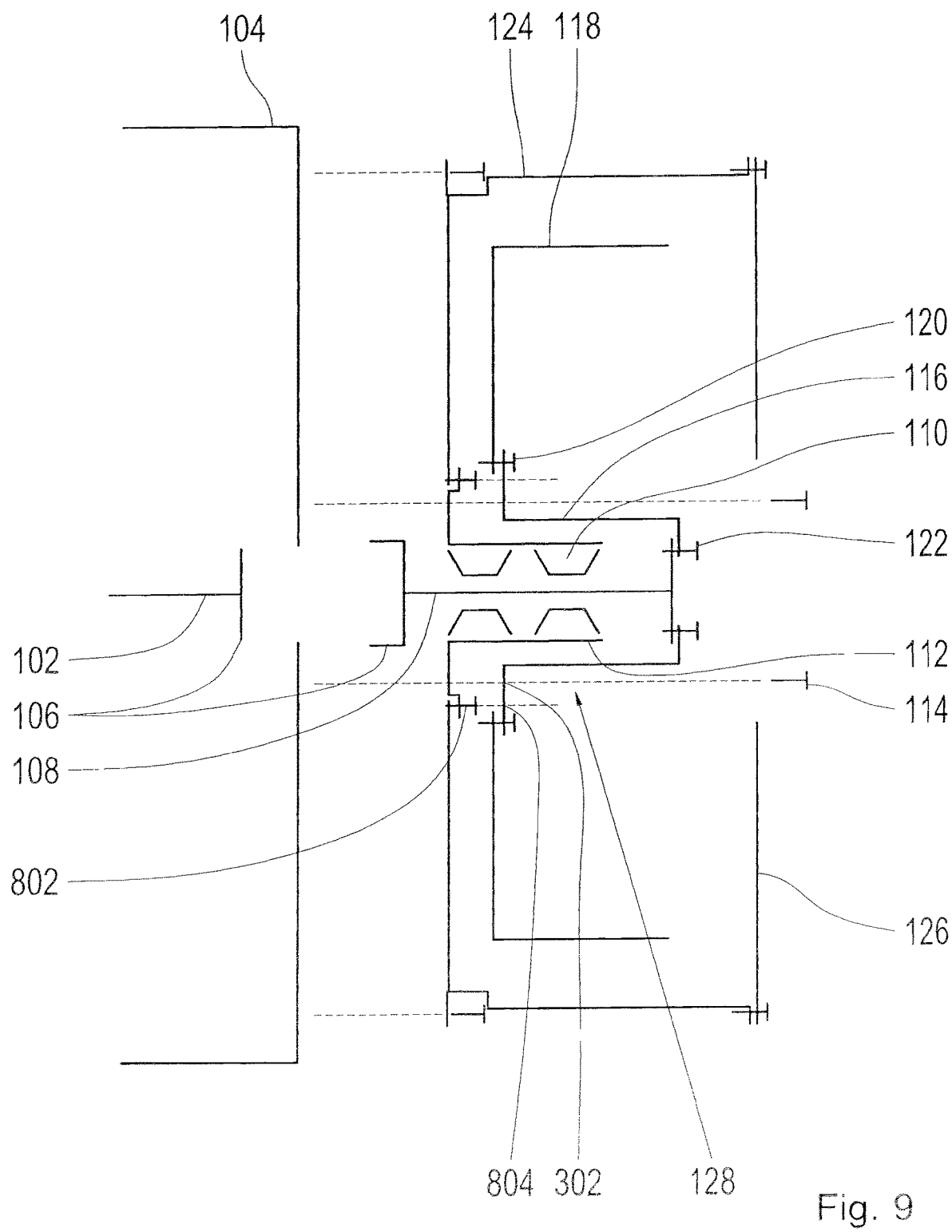
FIG. 9: The fitting of such a module.

FIG. 9 shows the assembly of the module 128 together with the rotor 118 and the generator housing 124. The support structure 112 is fixed to the generator housing 124 by means of the screw-bolts 802. By way of the first intermediate component 116 the rotor 118 is fitted onto the second shaft 108. Thus, the rotor 108 is held in position by the second shaft 108 of the module 128.

The transmission housing 124, the rotor 118 and the module 128 can be fitted as a unit onto the transmission housing 104. For this the module 128 and the generator housing 124 are bolted to the transmission housing 104. In addition, the spline teeth 106 are pushed together so that a rotationally fixed connection is formed between the first shaft 102 and the second shaft 108.

Figure 10:
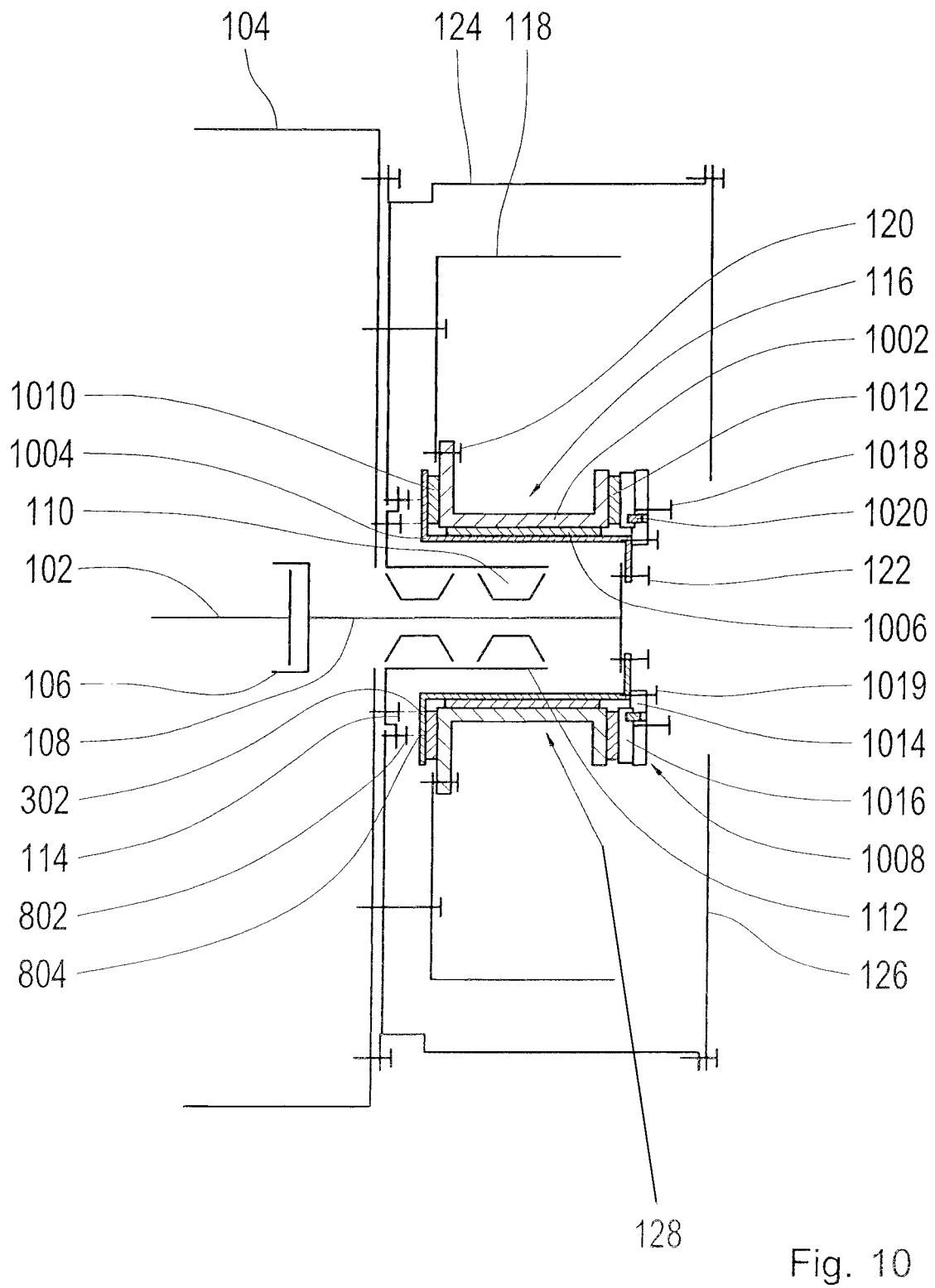
FIG. 10: A module with a structure corresponding to the structure of the module according to FIG. 8 and having a slipping clutch.

FIG. 10 shows a module 128 whose basic structure corresponds to that of the example embodiment shown in FIG. 8. However, in this case the first intermediate component 116 is designed as a slipping clutch.

The first intermediate component 116 has a first part 1002 and a second part 1004. By means of the bolt 120 the rotor 118 is joined to the first part 102.

A first insulator 1006 is positioned in the radial direction between the first part 1002 and the second part 1004. Together with the first part 1002 and the second part 1004 the first insulator 1006 extends concentrically around the rotational axis of the rotor 118, in such manner that a rotation of the first part 1002 about the rotational axis of the rotor 118 relative to the second part 1004 is possible.

The second part 1004 comprises a clamping device 1008. This applies a force which clamps the first part 1002 between a second insulator 1010 and a third insulator 1012. The clamping device 1008 has a baseplate 1014 and a plate 1016 that can be moved relative to the baseplate 1014 in the axial direction.

By means of bolts 1018 the movable plate 1016 can be tightened down toward the baseplate 1014. The baseplate 1014 is fixed on the second part 1004 by means of bolts 1019. Consequently a force acts upon the second insulator 1012, which force is transmitted via the first part 1002 to the first insulator 1010 and from there in turn to the second part 1004. A bolt 1020, preferably in the form of a cylindrical pin, is provided in order to prevent the movable plate 1016 from twisting relative to the baseplate 1014.

Alternatively to the intermediate component 116, the hub 402 shown in FIG. 4 can also be made as a slipping clutch in accordance with the system illustrated in FIG. 10, by virtue of the first part 1002, the second part 1004, the first insulator 1006, the second insulator 1010, the third insulator 1012 and the clamping device 1008.

INDEXES

102 First shaft
104 Transmission housing
106 Spline teeth
108 Second shaft
110 Bearings
112 Support structure
114 Screw-bolts
116 First intermediate component
118 Rotor
120 Screw-bolt
122 Screw-bolt
124 Generator housing
126 Cover
128 Module
202 Assembly safety device
302 Cut-out
402 Hub
404 Second intermediate component
502 Cut-out
602 Outer shell
604 Inner shell
606 Screw-bolt
608 Matching threads
610 Abutment
612 Thread
702 Groove
704 Disk
706 Transmission component
802 Screw-bolt
804 Cut-out
1002 First part
1004 Second part
1006 First insulator
1008 Clamping device
1010 Second insulator
1012 Third insulator
1014 Baseplate
1016 Movable plate
1018 Screw-bolt
1019 Screw-bolt
1020 Bolt

The invention claimed is:

1. An assembly for use in a drive-train of a wind turbine, the assembly comprising:
    a transmission;
    a generator;
    a module having at least one bearing, a support structure and either a shaft or a hub;
    the at least one bearing having an inner race and an outer race;
    the shaft or the hub of the module being rotatably mounted on the support structure by the at least one bearing so as to rotate relative to the support structure, the inner race of the at least one bearing being fixed on one of the support structure and the shaft or the hub of the module, and the outer race of the at least one bearing being fixed on the other one of the support structure and the shaft or the hub of the module;
    the shaft or the hub of the module being connectable, in a rotationally fixed manner, to a shaft of the transmission;
    a rotor of the generator being fixable to the shaft or the hub of the module;
    the support structure being releasably fixable to a housing of either the transmission or the generator such that, when the support structure is fixed thereto, relative rotation of the support structure is prevented and the shaft or the hub of the module is rotatable relative to the support structure;
    the rotor of the generator being fixable relative to the housing of the transmission by at least one assembly safety device; and
    the module, comprising the at least one bearing, the support structure and either the shaft or the hub, being attachable and removable from the housing of the transmission when the rotor of the generator is fixed relative to the housing of the transmission by the at least one assembly safety device.

2. The assembly according to claim 1, wherein
    at least a first part of the housing of the generator is fixable at least to the support structure such that the support structure is rotationally fixed relative to the housing of the generator and the shaft or the hub of the module is rotatable relative to the support structure.

3. The assembly according to claim 2, wherein the module, comprising the at least one bearing, the support structure and either the shaft or the hub, is attachable to and removable from the housing of the transmission while at least the first part of the housing of the generator is fixed to the support structure.

4. The assembly according to claim 1, wherein the module, comprising the at least one bearing, the support structure and either the shaft or the hub, is attachable to and removable from the housing of the transmission while at least a first part of the housing of the generator is fixed to the housing of the transmission.

5. The assembly according to claim 1, wherein
    at least one first cut-out is provided in the rotor of the generator, in a first intermediate component or in the hub, such that at least one fixing element is completely conveyable through the first cut-out,
    the at least one fixing element releasably connects at least one of:
    the support structure to the housing of at least one of the transmission or the generator,
    the rotor to the first intermediate component, and
    the first intermediate component to either the shaft of the module or the hub.

6. The assembly according to claim 5, wherein the rotor of the generator comprises a second cut-out through which the module is at least partially extendable.

7. The assembly according to claim 5, wherein
    at least one of the first intermediate component and a second intermediate component are removable, and
    the second intermediate component is connectable to the hub and forms a rotationally fixed connection between the shaft of the transmission and the rotor of the generator.

8. The assembly according to claim 5, wherein
    the hub or the first intermediate component comprises a first part and a second part such that the rotor is connectable to the first part, and at least one insulator is designed to insulate the first part electrically relative to the second part.

9. The assembly according to claim 8, wherein the at least one insulator is designed to support the first part in at least one radial direction relative to the second part.

10. The assembly according to claim 8, wherein the second part is designed to clamp the first part between the at least one insulator and a further insulator.

11. The assembly according to claim 1, wherein the shaft of the module is mounted, via the at least one bearing, radially within the support structure.

12. The assembly according to claim 1, wherein the housing of the generator is fixed to the housing of the transmission, and the support structure of the module is disconnectable from the housing of the transmission for removal of the module while the rotor of the generator is fixed to the housing of the transmission.

13. The assembly according to claim 1, wherein the shaft of the module extending completely through the support structure into the housing of the transmission and being connected to the shaft of the transmission within an interior of the housing of the transmission.

14. A transmission of an assembly for use in a drive-train of a wind turbine, the assembly comprising:
a generator;
a module having at least one bearing, a support structure and either a shaft or a hub;
the at least one bearing having an inner race and an outer race;
the shaft or the hub of the module being mounted on the support structure by the at least one bearing so as to rotate in the support structure, the inner race of the at least one bearing being fixed on one of the support structure and the shaft or the hub of the module, and the outer race of the at least one bearing being fixed on the other one of the support structure and the shaft or the hub of the module;
the shaft or the hub of the module being connectable, in a rotationally fixed manner, to a shaft of the transmission;
a rotor of the generator being fixable to the shaft or the hub of the module;
the support structure being fixable to a housing of either the transmission or the generator such that the support structure is rotationally fixed relative thereto, and the housing of the generator being connectable to the housing of the transmission such that the rotor of the generator, and the support structure, the at least one bearing and at least a portion of the shaft or the hub of the module are arranged within the housing of the generator;
the rotor of the generator being fixable to the housing of the transmission by at least one assembly safety device;
the module, comprising the at least one bearing, the support structure and either the shaft or the hub, being attachable in the drive train within the housing of the generator and when the rotor of the generator is fixed to the housing of the transmission by the assembly safety device, the module is detachable from the housing of the generator for removal of the module from the drive train; and
the module is attachable to and removable from the housing of the transmission while at least a first part of the housing of the generator is fixed to the support structure.

15. A method for removing a module of an assembly for use in a drive-train of a wind turbine, the assembly having a transmission and a generator, and the module having at least one bearing, a support structure and either a shaft or a hub, the at least one bearing having an inner race and an outer race, the shaft or the hub of the module is mounted to rotate on and relative to the support structure by the at least one bearing, the inner race of the at least one bearing being fixed on one of the support structure and the shaft or the hub of the module, and the outer race of the at least one bearing being fixed on the other one of the support structure and the shaft or the hub of the module, the shaft or the hub of the module is connectable in a rotationally fixed manner to a shaft of the transmission, a rotor of the generator is fixable to the shaft or the hub of the module, the support structure is fixable to a housing of either the transmission or the generator such that, when the support structure is fixed thereto, relative rotation of the support structure is prevented and the shaft or the hub of the module is rotatable relative to the support structure, the rotor of the generator is fixable by at least one assembly safety device, and the module having the at least one bearing, the support structure and either the shaft or the hub is attachable and removable when the rotor of the generator is fixed to the housing of the transmission by the at least one assembly safety device, the method comprising:
fixing the rotor of the generator to the housing of the transmission via the assembly safety device;
releasing the fixing of the rotor of the generator to the shaft of the module or to the hub;
releasing the fixing of the support structure to the housing of the transmission or the generator; and
removing the module having the at least one bearing, the support structure and either the shaft or the hub of the module while the rotor of the generator is fixed to the housing of the transmission via the assembly safety device.

* * * * *